Aug. 10, 1965          N. E. STARKEY          3,199,293
TWO SHAFT GAS TURBINE CONTROL SYSTEM
Filed Aug. 15, 1963
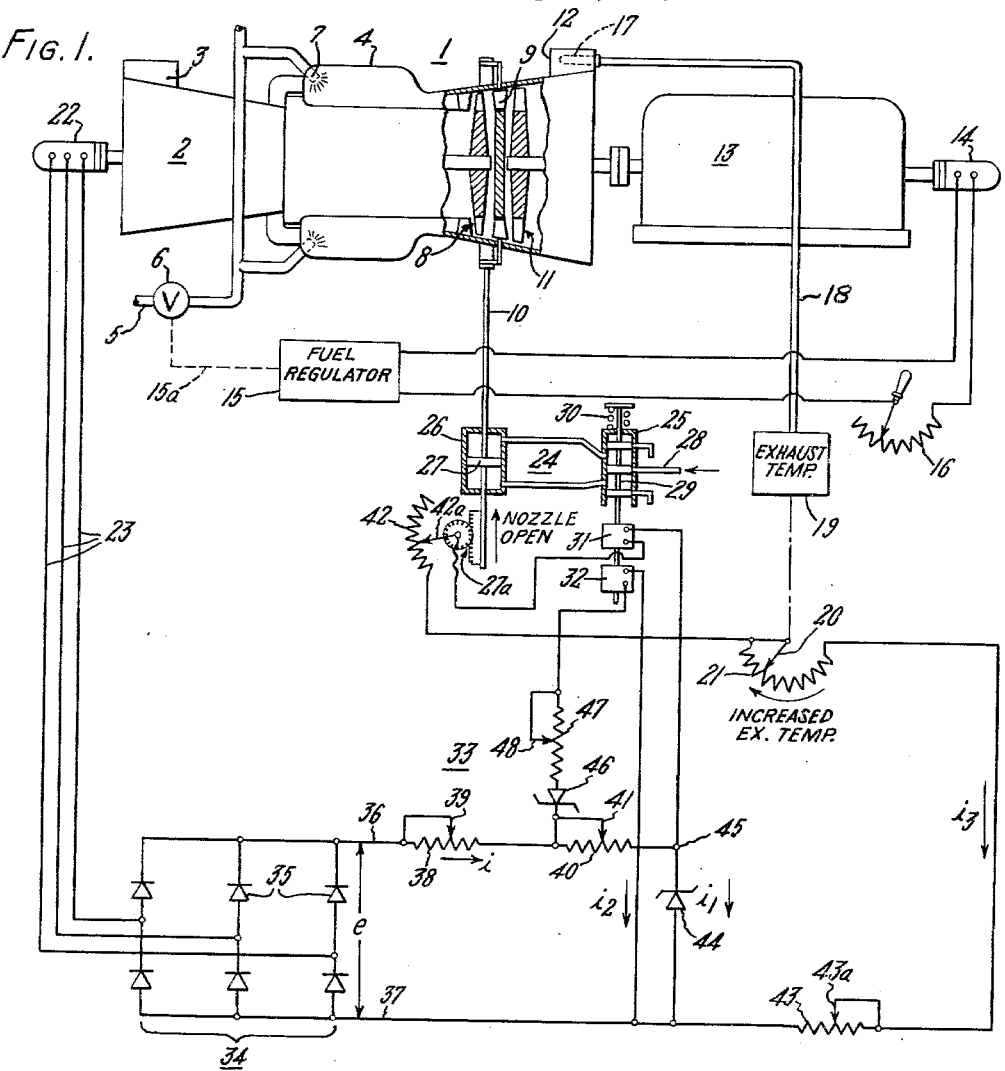
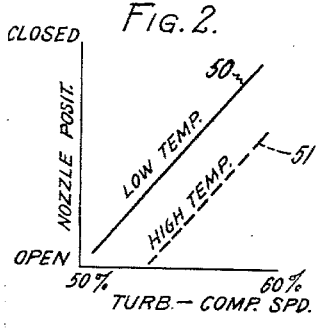
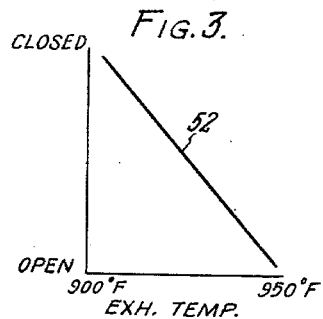
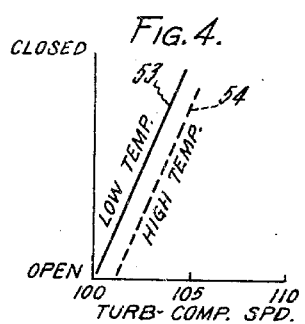
INVENTOR
NEAL E. STARKEY
BY W. C. Crutcher
HIS ATTORNEY United States Patent Office 3,199,293
Patented Aug. 10, 1965

3,199,293
TWO SHAFT GAS TURBINE CONTROL SYSTEM
Neal E. Starkey, Schenectady, N.Y., assignor to General Electric Company, a corporation of New York
Filed Aug. 15, 1963, Ser. No. 302,355
5 Claims. (Cl. 60—39.25)

This invention relates to gas turbine control systems, and particularly to an improved regulating system for controlling a variable turbine nozzle in a gas turbine powerplant of the type having a turbine-compressor unit and a second turbine rotor mechanically independent of the turbine-compressor rotor for delivering the useful power output, with a ring of variable angle nozzle blades interposed between the compressor turbine and the load output turbine.

Gas turbine designers have previously noted that the flexibility of operation of the gas turbine power plant is greatly improved if the turbine-compressor unit is divorced from the load output turbine unit and a variable angle turbine nozzle is used, so that the speed of the compressor supplying air to the combustion system is controllable independent of the speed at which the power output shaft rotates. Thus, the compressor can be operated at a speed at which it is most efficient, while the speed of the load output turbine can vary as required by the nature of the power-consuming device to which it is connected.

The maximum operating temperatures, and hence highest efficiency, at which gas turbines can operate are limited by the strength of the available materials at these elevated temperatures. It has been noted that the highest possible efficiency can be maintained over a wide variety of operating conditions by using means responsive to the turbine exhaust temperature to control one or more operating conditions of the gas turbine power plant so as to hold the turbine exhaust temperature substantially constant despite other, sometimes conflicting, requirements on the powerplant.

One such arrangement is disclosed in U.S. Patent 2,625,789 issued to N. E. Starkey on January 20, 1953, and assigned to the assignee of the present application. In that patent, the exhaust temperature of the gas turbine serves to control the speed setting of the turbine-compressor rotor, while the speed or load of the load turbine rotor is measured and used to control the fuel flow. The turbine-compressor regulating system causes the turbine-compressor to "follow" load changes on the load turbine by furnishing varying rates of air flow to the combustion chambers in accordance with the fuel requirements dictated by these load changes.

This invention is an improvement over my aforementioned U. S. Patent 2,625,789, and reference may be made thereto for a more complete description of some of the conventional accessory regulating devices, which are depicted schematically in this application in order not to obscure the invention.

One disadvantage of the control system in the aforementioned patent is the fact that the control effects of incremental speed changes of the turbine-compressor and the control effects of incremental changes in exhaust temperature interact with one another in a similar way over all ranges of gas turbine operation. This leads to stability problems and inflexibility in meeting conflicting requirements. First, it is desired to limit the minimum speed of the compressor-turbine. Second, above this minimum speed and below the maximum speed, it is desired to control the exhaust temperature. Third, it is desired to limit the maximum speed. In the first and third cases, where the control is primarily required to limit speed, the system gain (or sensitivity of response) can be set quite high and still be stable. In the second region, where the control primarily controls temperature, a lower gain is generally required for stability. The system proposed gives the ability to set the system gain of the three regions of operation independent of each other, so that the varying stability requirements can be met.

Accordingly, one object of the present invention is to provide an improved regulating system for a two-shaft gas turbine which provides different types of control in different regions of operation of the turbine-compressor unit.

Another object of the invention is to provide an improved regulating system for the turbine-compressor unit of a two-shaft gas turbine with a variable nozzle, wherein both exhaust gas temperature and turbine-compressor speed affect the variable nozzle in different ways at turbine-compressor different speeds.

It is another object of the invention to provide an improved regulating system for the turbine-compressor unit in a gas turbine of the type described, wherein a variable angle nozzle is largely "temperature regulated" with relatively low "system gain" over one range of speeds, and largely "speed regulated" with relatively high "system gain" over another range of speeds.

Still another object of the present invention is to provide an improved electrical circuit for the regulating system of a two-shaft gas turbine, in which the most desirable type of control over the unit is effected over each of several turbine-compressor speed ranges, and which may be easily adjusted for different conditions.

The organization and operation of the invention, together with further objects and advantages thereof, may best be understood by reference to the following description, taken in connection with the accompanying drawings, in which:

FIG. 1 is a diagrammatic representation of a two-shaft gas turbine powerplant having a control system in accordance with the invention, and FIGS. 2–4 are graphs illustrating the operation of the control system over different speed ranges.

Briefly stated, the invention is practiced by regulating the position of a variable angle nozzle through a control system which is responsive both to the exhaust temperature of the motive fluid leaving the gas turbine and to the speed of the turbine-compressor unit, and additionally employing means to separately select the effect of incremental changes of either of these control variables on the nozzle position, relative to a selected speed range of the turbine-compressor.

Referring now to FIG. 1 of the drawing, a two-shaft gas turbine, shown generally as 1, includes a compressor 2 receiving air from an inlet 3 and furnishing it to one or more combustion chambers 4. Fuel, which may be either gas or liquid, is furnished from a pressurized source through a line 5 and controlled by a valve 6 to effect its delivery through spray nozzles 7. Hence, valve 6 controls the rate of combustion in combustion chambers 4. Hot combustion gases then flow through the blades of an axial flow high-pressure turbine rotor 8, which is sometimes referred to as the compressor turbine, since its primary purpose is to furnish motive power to drive compressor 2. (The compressor 2 and the compressor turbine 8 are referred to herein as a turbine-compressor, when considered as a single unit.) The gas then flows through an annular ring of variable angle nozzle blades 9, whose angles of opening are adjusted by a rod 10 through a mechanical linkage.

A suitable variable angle nozzle construction may be seen in U.S. Patent 2,919,890 issued to A. N. Smith et al. on January 5, 1960 and assigned to the present assignee. From nozzle blades 9, the gas flows through the blades of a load turbine rotor 11 and thence out through an exhaust duct 12. Load turbine 11 drives a load 13, such as a generator, and the speed of the coupled elements 11, 13 is measured by a tachometer generator 14, furnishing a voltage which is proportional to its speed, as is well known in the art.

In accordance with the general type of control system represnted, both by this application and the aforementioned Starkey application, the speed (or load) variation of the load turbine 11 may be indicated, for example, as a change in the voltage of generator 14, which causes a fuel regulator 15 to adjust the opening of fuel valve 6, as indicated by dotted line 15a. The desired speed (or load) setting of the load turbine is effected by manual adjustment of a rheostat 16. Thereafter, an increased load on load turbine 11 will cause it to slow and fuel regulator 15 will respond by opening fuel valve 6 to increase the fuel flow until the load turbine comes back to the desired speed. The details of the mechanism of fuel regulator 15 are immaterial to the present invention, and a full description of a suitable fuel regulator may be had by reference to the aforementioned Starkey patent.

Referring now to the regulating system of the turbine-compressor unit which is the primary subject of this invention, one variable input to the regulating system is the temperature of the exhaust gas leaving through duct 12. A suitable temperature sensor 17, disposed in duct 12, is constructed so as to send a signal, for example as by a change in gas pressure in a line 18, to an exhaust temperature controller 19. Variations in exhaust gas temperature cause controller 19 to rotate arm 20 on a rheostat 21.

The details of a suitable exhaust temperature control can be seen in my aforementioned patent, and it is sufficient for an understanding of the invention to be described to merely state that an increase in turbine exhaust gas temperature near sensor 17 will cause the exhaust temperature controller 19 to move the arm 20 on rheostat 21 clockwise, as indicated by the arrow, to a new position so as to increase the resistance across the terminals of rheostat 21.

The other varying input to the turbine-compressor regulating system to be described is the turbine-compressor speed, which is conveniently provided by means of a three-phase A.C. tachometer generator shown at 22, which is geared or coupled to the turbine-compressor unit. Tachometer generator 22 supplies an A.C. voltage over phase leads 23, which voltage is proportional to the speed of the unit. The speed of the turbine-compressor determines the rate at which air is supplied to combustion chambers 4. Another indicia of air flow which might be used instead of speed is the air pressure at the compressor outlet.

The means by which the regulating system effects control over the gas turbine is by a hydraulic servo system 24, which sets the angle of the variable nozzle vanes 9. The servo 24 includes a hydraulic pilot valve 25 and a hydraulic piston actuator 26. The piston 27 of actuator 26 is mechanically connected to the actuating rod 10 of nozzles 9 through a suitable linkage. Upward movement of piston 27 of the actuator serves to open the nozzle, and thereby increases the pressure drop of the motive fluid across the blades of the compressor turbine 8, while decreasing pressure drop across the blades of load turbine 11.

The pilot valve 25 controls flow of hydraulic fluid from a suitable pressurized source through inlet line 28. A stem 29 on pilot valve 25 is held force-balanced in the neutral position shown against the upward bias of a compression spring 30 by means of solenoid control coils 31, 32. The polarity of the windings on coils 31, 32 is such that an increased current flow through either or both of the coils causes the stem 29 to be pulled downward against the compression spring 30. This allows hydraulic fluid to flow to the upper side of piston 27, which moves the nozzle vanes 9 to a more closed position. Similarly, decrease of the current flowing through either or both of coils 31, 32, when the pilot stem 29 is in the neutral position, allows spring 30 to move the pilot stem upward, letting fluid flow to the lower side of piston 27 and causing the nozzles 9 to open. A rack-and-pinion mechanism 27a is connected to piston 27 to provide a feedback function later to be described.

Referring now to the preferred means for regulating the nozzle vanes 9 in response to changes in exhaust temperature and turbine-compressor speed, reference is made to an electrical circuit designated generally as 33. The source of electrical potential for circuit 33 is the tachometer generator 22, which is connected through leads 23 to a conventional three-phase bridge rectifier shown generally as 34. Bridge rectifier 34 is made up of diodes 35 connected as shown, so as to furnish a D.C. potential in line 36 which is positive with respect to that in line 37. The D.C. potential across leads 36, 37 (designated $e$) is directly proportional, therefore, to the speed of the turbine-compressor, as will be understood by those skilled in the art.

A first current path between leads 36, 37 and supplied by potential $e$ consists of a variable resistance 38 having a movable tap 39, a variable resistance 40 with a movable tap 41, the winding of solenoid control coil 31, a variable resistance 42 with a movable arm 42a, variable resistance 21 with arm 20, and a variable resistance 43 with a movable tap 43a.

A second current path between leads 36, 37 is established through the variable resistance 38, variable resistance 40, and a Zener diode 44, which is connected to oppose voltage $e$ and prevent current flow therethrough until a selected predetermined voltage is exceeded. Thereafter Zener diode 44 permits reverse current flow as long as the potential across it exceeds its breakdown voltage and thereby serves to clamp the voltage at node 45 at a fixed value. The variable resistances 38, 40 may be adjusted by moving taps 39, 41 to select a current flow and corresponding voltage drop across them which, for a given $e$, will cause the diode 44 to break down and permit a shunt current to flow.

A third current path is established through variable resistance 38, a Zener diode 46 (connected to oppose voltage $e$ in the same manner as the previously mentioned diode 44), a variable resistance 47 with a movable tap 48, and the winding of control solenoid 32 on the hydraulic pilot valve. The Zener diode 46 is selected to have a higher breakdown voltage than Zener diode 44. By adjusting resistance 38, the voltage across diode 46 may be selected for a given potential $e$.

By proper selection, therefore, of the breakdown voltages of diodes 44, 46 with respect to the other circuit constants and by proper adjustment of resistances 38, 40, the diodes 44, 46 will allow current to flow at selected low and high voltages corresponding to selected "minimum" and "maximum" turbine-compressor speeds.

The total current $i$ flowing in circuit 33 is determined by the resistances in the various series-parallel connected branches and also by whether or not the diodes 44, 46 happen to be conducting for a particular voltage $e$. For purposes of analysis, current $i$ may be considered as divided into portions $i_1$, $i_2$ and $i_3$ flowing through the branches of circuit 33 as designated on the drawing.

It will be understood that, due to the operation of the Zener diodes, currents $i_1$ and $i_2$ will be essentially zero with only $i_3$ flowing, until voltage $e$ exceeds the voltage corresponding to breakdown of diode 44, whereupon currents $i_1$, $i_3$ will flow in two parallel branches as indicated by the arrows. When voltage $e$ reaches a still higher value such that diode 46 permits current flow, the currents $i_1$, $i_2$ and $i_3$ will flow as indicated by the arrows.

The operation of the circuit 33 is as follows. Below a certain "minimum" speed, which can be preselected as described above, the positioning of the nozzle vanes is affected both by changes in exhaust temperature and by changes in turbine-compressor speed. The characteristic of operation in this first phase is shown on FIG. 2, where it is seen that the primary control over the nozzle angle in this speed range is brought about by speed variations.

Referring back to FIG. 1, an increasing turbine-compressor speed (assuming exhaust temperature constant) increases voltage $e$ causing current $i_3$ to increase ($i_1$ and $i_2$ are zero). Increasing current $i_3$ causes control coil 31 to pull pilot valve stem 29 downward to admit fluid above piston 27, moving the nozzle to a more closed position. Closing the nozzle has the effect of decreasing the pressure drop across the blades of compressor turbine 8, slowing the rotor down and reducing the air flow. This closing motion of the nozzle provides a feedback function by means of rack-and-pinion 27a, which rotates arm 42a clockwise. Rotation of arm 42a increases variable resistance 42 which causes current $i_3$ to decrease. Decreasing current $i_3$ reduces the downward pull exerted by control coil 31, shutting off flow to actuator 26, and the nozzle assumes a new, more closed, position than previously.

The foregoing explanation assumes a constant exhaust temperature. Curve 51 of FIG. 2 illustrates that a different characteristic is obtained at a higher exhaust temperature. If we examine the effects of changing exhaust temperature on circuit 33, at a constant speed (voltage $e$ constant), it will be observed that an increase in exhaust temperature causes arm 20 of variable resistance 21 to rotate clockwise, increasing resistance 21, decreasing current $i_3$, to cause pilot valve stem 29 to move upward. Upward movement of stem 29 admits hydraulic fluid beneath piston 27, causing the nozzle to move to a more open position. Opening the nozzle serves, by means of the rack-and-pinion 27a, to rotate arm 42a counterclockwise and decrease resistance 42. This continues until resistance 42 has decreased by the same amount that resistance 21 increased (assuming $e$ constant). This returns current $i_3$ to its former value, recentering the pilot valve stem 29 and stopping the movement of nozzle actuator piston 27. Thus the higher exhaust temperature shifts the characteristic curve from 50 toward 51 on FIG. 2.

The incremental changes in nozzle position with speed, i.e., the slope of lines 50, 51 is determined by resistance 42. The spread between lines 50, 51 is determined by resistance 21. Resistance 43 is a trimmer for minor adjustment.

Although operation in the speed range shown on FIG. 2 has been explained as though the exhaust temperature and the turbine-compressor speed were separately held constant, it will be observed that, as a matter of fact, they may change simultaneously and the angle of nozzle blades 9 is under joint control of exhaust temperature and speed in this speed range. The actual speed and exhaust temperature will depend on the rate of fuel supply to the combustion chambers 4 according to the load on turbine 11, which in turn will cause the turbine compressor to seek an ascertainable operating point.

In the second phase of operation, the angle of the variable nozzle blades is under the influence of exhaust temperature alone, as shown by curve 52 in FIG. 3. When the turbine-compressor speed has increased to a selected minimum speed (here 60% rated speed) such that voltage $e$ current $i_1$ to flow through Zener diode 44, any further rise in speed and further increase in voltage $e$ will not cause the voltage at 45 to increase. Between this selected "minimum" turbine-compressor speed and a selected "maximum" speed at which Zener diode 46 breaks down to allow current $i_2$ to flow, the nozzle angle is solely under the control of exhaust temperature. It will be observed that changes in exhaust temperature cause the exhaust temperature regulating devices 19 to vary the resistance 21, which increases or decreases current $i_3$. Because of the "constant voltage source," speed changes cannot affect current $i_3$ as before. Changes of current $i_3$ in the control coil 31 vary the position of the nozzle actuating piston 27, as before. The rack-and-pinion 27a increases or decreases resistance 42 in the same manner as described previously to counterbalance changes in resitsance 21, so that the nozzle assumes a different opening for each exhaust temperature. However, since resistances 38, 40 do not influence changes in current $i_3$, the gain of the system is lower, giving good stability.

The third phase or mode of operation is above a predetermined "maximum" speed (here selected as 100% of rated speed), at which Zener diode 46 allows current $i_2$ to flow. The control characteristic during this phase is depicted in the graph of FIG. 4. Upon breakdown of diode 46, current $i_2$ commences to flow. This causes solenoid control coil 32 to contribute to the downward force on pilot valve stem 29. Since the resistance 47 and the resistance of coil 32 primarily determine current $i_2$, resistance 47 can be adjusted to set the gain of this circuit. Thus resistance 47 can be separately adjusted so that the incremental changes in turbine-compressor speed (voltage $e$) effect even more rapid changes in the position of the nozzle than in the first phase of operation. This is illustrated in FIG. 4, where curve 53 is seen to have a greater slope than does curve 50 in FIG. 2 for the same speed scale. This is as desired since, in the event of overspeed, it is necessary that the nozzles close quickly to prevent operspeed of the turbine-compressor unit. A higher exhaust temperature causes the characteristic curve to shift toward a more open nozzle position as shown by curve 54. The operation of the exhaust temperature control portion is the same as previously. However, it will be observed that the spread between curves 53, 54 in FIG. 4 is less than the spread between curves 50, 51 in FIG. 2. This is because the effect of changes in current $i_3$ on the servo pilot valve 25 is diminished due to the shunt currents $i_1$, $i_2$.

It will be apparent that, once the principle of the invention is understood, many variations are possible. The principle consists of employing more than one measured quantity to effect control, but to selectively employ different relationships between the controlling variables over different operating ranges of the prime mover, or to eliminate one of the variables completely if this gives the best means of control. Also the system gain can be different in different regions of gas turbine operation. Although turbine-compressor speed and exhaust temperature are shown as the variables for controlling the turbine-compressor unit, alternate or additional parameters might be selected such as compressor air pressure, compressor inlet temperature, etc.

The arrangement shown provides "temperature regulation" of the nozzle vanes in accordance with exhaust temperature over a "normal" operating range of turbine-compressor speeds during moderate load changes. In addition, it employs turbine-compressor speed changes below a "minimum" speed and above a "maximum" speed to effect "speed regulation" of the nozzle. However, in this case, the nozzle continues to be "temperature regulated" jointly with the aforementioned "speed regulation." Of course, as mentioned, the incremental changes of the control variables used to effect nozzle angle changes can be individually adjusted in different operating regions by means of the variable resistances shown in the circuit.

While there has been shown what is considered to be the preferred embodiment of the invention, other modifications will occur to those skilled in the art. It is, of course, intended to cover in the appended claims all such modifications which fall within the true spirit and scope of the invention.

What I claim as new and desire to secure by Letters Patent of the United States is:

1. In a two-shaft gas turbine of the type having a turbine-compressor discharging motive fluid through a variable nozzle to a mechanically independent load turbine, the combination of:

(a) first means responsive to turbine-compressor speed, (b) second means responsive to gas turbine exhaust temperature, (c) servo means controlled by said first and second means to position the variable nozzle in response to changes in turbine-compressor speed and exhaust temperature, and (d) electrical circuit means having elements therein which are activated at selected turbine-compressor speeds by said first means to change the characteristics of said circuit means for selectively modifying the effects of incremental changes of turbine-compressor speed and exhaust temperature on said third means over different selectable ranges of turbine-compressor speed.

2. In a two-shaft gas turbine of the type having a turbine-compressor discharging motive fluid through a variable nozzle to a mechanically independent load turbine, the combination of:

(a) means responsive to turbine-compressor speed and furnishing a source of electrical potential proportional to said speed, (b) a series branch supplied by said source including therein a variable impedance device which is varied in response to motive fluid temperature, and a current responsive device arranged to position said nozzle according to the current flowing therein, whereby either change in speed or change in exhaust temperature will position said nozzle, and (c) voltage responsive means connected in shunt across said series branch so as to limit the electrical potential supplied to said devices above a selected minimum turbine-compressor speed, whereby the nozzle position is primarily resopnsive to motive fluid temperature changes above said minimum speed.

3. In a two-shaft gas turbine of the type having a turbine-compressor discharging motive fluid through a variable nozzle to a mechanically independent load turbine, combination of:

(a) means responsive to turbine-compressor speed and furnishing a source of electrical potential proportional to said speed, (b) first and second current responsive devices, each arranged to decrease the opening of said variable nozzle when the current flow therethrough increases, each of said current responsive devices being arranged to be connected in parallel across said source, (c) variable impedance means connected in series with said first current responsive device across said source, (d) means responsive to turbine exhaust temperature for increasing the impedance of said variable impedance means when the exhaust temperature increases, and (e) means responsive to the potential of said source for connecting the second current responsive means across the source to assist in closing the nozzle when the potential of the source exceeds a selected value corresponding to a maximum desired speed.

4. The combination according to claim 3, including second means responsive to the potential of said source and connected in parallel across the source ahead of said first current responsive means to limit the potential thereto to a substantially constant value when a selected minimum speed is reached, whereby the nozzle is controlled by exhaust temperature between said minimum and maximum speeds.

5. In a two-shaft gas turbine of the type having a turbine-compressor discharging motive fluid through a variable nozzle to a mechanically independent load turbine, the combination of:

(a) means responsive to turbine-compressor speed and furnishing a source of electrical potential proportional to said speed, (b) means responsive to temperature of the motive fluid and adjusting a first variable impedance device so that the impedance thereof increases with motive fluid temperature, (c) electrohydraulic servo means for positioning said variable nozzle in response to the current flowing through either of first and second actuating coils, increased current in either of said coils serving to move the nozzle in a closing direction, (d) a second variable impedance device arranged to be actuated by said servo means so that the impedance thereof increases when the nozzle moves in a closing direction, (e) first and second Zener diodes selected to permit reverse current flow therethrough when the voltage thereacross exceeds selected high and low breakdown voltages respectively, (f) first, second and third circuit branches dividing the current from said source, the first branch comprising said first Zener diode and said first coil in series, the second branch comprising said second Zener diode, and the third branch comprising said first and second variable impedances and said second coil in series.

References Cited by the Examiner

UNITED STATES PATENTS

| | | | |
|---|---|---|---|
| 2,625,789 | 1/53 | Starkey | 60—39.16 |
| 2,912,824 | 11/59 | Van Nest | 60—39.16 |
| 2,943,448 | 7/60 | Berggren | 60—39.28 |
| 2,971,337 | 2/61 | Wintrode | 60—39.28 |

SAMUEL LEVINE, *Primary Examiner.*